US006777689B2

(12) United States Patent
Nelson

(10) Patent No.: US 6,777,689 B2

(45) Date of Patent: Aug. 17, 2004

(54) ARTICLE IRRADIATION SYSTEM SHIELDING

(75) Inventor: Glenn Nelson, Placerville, CA (US)

(73) Assignee: Ion Beam Application, S.A. (BE)

( * ) Notice: Subject to any disclaimer, the term of this patent is extended or adjusted under 35 U.S.C. 154(b) by 127 days.

(21) Appl. No.: 09/987,968

(22) Filed: Nov. 16, 2001

(65) Prior Publication Data

US 2003/0094578 A1 May 22, 2003

(51) Int. Cl.[7] .......... G01N 21/00

(52) U.S. Cl. .......... 250/455.11

(58) Field of Search .......... 250/453.11, 455.11, 250/459.11; 378/69

(56) References Cited

U.S. PATENT DOCUMENTS

| | | | | |
|---|---|---|---|---|
| 924,248 | A | 6/1909 | Lazear | |
| 1,809,078 | A | 6/1931 | Smith | |
| 2,095,502 | A | 10/1937 | Johnston | |
| 2,602,751 | A | 7/1952 | Robinson | |
| 2,741,704 | A | 4/1956 | Trump et al. | |
| 2,887,583 | A | 5/1959 | Emanuelson | |
| 2,897,365 | A | 7/1959 | Dewey, II et al. | 250/49.5 |
| 2,989,735 | A | 6/1961 | Gumpertz | |
| 3,087,598 | A | 4/1963 | Clore | 198/38 |
| 3,224,562 | A | 12/1965 | Bailey et al. | 198/131 |
| 3,261,140 | A | 7/1966 | Long et al. | 53/22 |
| 3,452,195 | A | 6/1969 | Brunner | 250/52 |
| 3,564,241 | A | 2/1971 | Ludwig | 250/52 |
| 3,676,675 | A | 7/1972 | Ransohoff et al. | 250/52 |
| 3,833,814 | A | 9/1974 | Nablo | 250/492 |
| 3,901,807 | A | 8/1975 | Trump | 210/198 |
| 3,915,284 | A | 10/1975 | Knockeart et al. | 198/34 |
| 4,020,354 | A | 4/1977 | Fauss et al. | 250/492 B |
| 4,075,496 | A | 2/1978 | Uehara | 250/492 B |
| 4,166,673 | A | 9/1979 | Dona | 350/97 |
| 4,295,048 | A | 10/1981 | Cleland et al. | |
| 4,446,374 | A | 5/1984 | Ivanov et al. | |
| 4,481,654 | A | 11/1984 | Daniels et al. | 378/110 |
| 4,514,963 | A | 5/1985 | Bruno | 53/493 |
| 4,561,358 | A | 12/1985 | Burgess | 104/89 |
| 4,653,630 | A | 3/1987 | Bravin | 198/460 |
| 4,690,751 | A | 9/1987 | Umiker | 209/3.3 |
| 4,839,485 | A | 6/1989 | Koch et al. | 219/10.55 |
| 4,852,138 | A | 7/1989 | Bergeret et al. | 378/69 |
| 4,978,501 | A | 12/1990 | Diprose et al. | 422/22 |
| 5,038,911 | A | 8/1991 | Doane et al. | 198/357 |
| 5,096,553 | A | 3/1992 | Ross et al. | 204/157.15 |

(List continued on next page.)

FOREIGN PATENT DOCUMENTS

| | | |
|---|---|---|
| EP | 0 633 466 | 1/1995 |
| WO | 99 67793 | 12/1999 |
| WO | 00 68955 | 11/2000 |
| WO | 01 25754 | 4/2001 |

OTHER PUBLICATIONS

L.V. Spencer, Energy Dissipation by Fast Electrons, 1959, National Bureau of Standards Monograph 1, US Dept. of Commerce, National Bureau of Standards, pp 1–70.

(List continued on next page.)

*Primary Examiner*—John R. Lee
*Assistant Examiner*—Johnnie L Smith, II
(74) *Attorney, Agent, or Firm*—Dorsey & Whitney LLP

(57) ABSTRACT

An article irradiation system is arranged into an upper level and a lower level. The upper level houses a radiation source used to generate beams of radiation for irradiating articles. The radiation source can emit multiple beams of radiation, for irradiating articles on the upper and the lower levels. The upper level has an upper level shield, arranged as an inner shield and an outer shield, for attenuating radiation generated by the radiation source. The lower level can be disposed below ground level, and a portion of the lower level is covered by the upper level shield, which reduces the shielding requirements for a ceiling of the lower level.

33 Claims, 10 Drawing Sheets

U.S. PATENT DOCUMENTS

| | | | | | |
|---|---|---|---|---|---|
| 5,137,139 | A | | 8/1992 | Ruscello | 198/460 |
| 5,341,915 | A | | 8/1994 | Cordia et al. | 198/460 |
| 5,341,916 | A | | 8/1994 | Doane et al. | 198/460 |
| 5,396,074 | A | | 3/1995 | Peck et al. | 250/453.11 |
| 5,400,382 | A | | 3/1995 | Welt et al. | 378/69 |
| 5,810,707 | A | * | 9/1998 | Montebello et al. | 600/1 |
| 5,994,706 | A | * | 11/1999 | Allen et al. | 250/454.11 |
| 6,051,185 | A | * | 4/2000 | Beers | 422/22 |
| 6,127,687 | A | | 10/2000 | Williams et al. | 250/492.3 |
| 6,191,424 | B1 | * | 2/2001 | Stirling et al. | 250/455.11 |
| 6,215,847 | B1 | * | 4/2001 | Perrins et al. | 378/69 |
| 6,294,791 | B1 | * | 9/2001 | Williams et al. | 250/455.11 |
| 6,459,089 | B1 | * | 10/2002 | Masefield et al. | 250/453.11 |
| 6,463,123 | B1 | * | 10/2002 | Korenev | 378/69 |
| 6,468,471 | B1 | | 10/2002 | Loda et al. | 422/22 |
| 6,492,645 | B1 | | 12/2002 | Allen et al. | 250/453.11 |
| 6,529,577 | B1 | * | 3/2003 | Allen et al. | 378/69 |
| 6,583,423 | B2 | | 6/2003 | Rose | 250/453.11 |

OTHER PUBLICATIONS

ASTM Designation:L E1608–00, Standard Practice for Dosimetry in an X–Ray (Bremsstrahlung) Facility for Radiation Processing Annual Book of ASTM Standards, American Society for Testing and Materials, Conshohocken, PA 19428.

H.W. Koch et al., Electron Accelerators for Food Processing, 1965, Radiation Preservation of Foods, National Academy of Science–National Research Council Publication 1273, pp 149–173.

K.H. Morganstem, S–Ray Radiation Sources, 1964, Presented at the American Nuclear Society Seminar on the Radiation Processing Industry, Washington, DC.

J.P. Farrell, Trhe Bremsstrahlung Radiation Field of a Scanned Monoenergetic Electron Beam, 1966, Presented at the International Nuclear Industries Fair, Nuclex 66, Basle, Switzerland.

K.H. Morganstern, Appraisal of the Advantages and Disadvantages of Gamma, Electron and X–Ray Radiation Sterilization, 1974, Presented at the Symposium on Ionizing Radiation for Sterilization of Medical Products and Biological Tissues, Bombay, India, IAEA–SM 192/8, International Atomic Energy Agency, Vienna, Austria.

J. Paul Farrell, High–Power Bremsstrahlung Sources for Radiation Sterilization, 1979, Radiation Physics and Chemistry, vol. 14, Nos. 3–6, –377–387.

J. Paul Farrell, Examination of Product Throughout Obtained From High Power Bremsstrahlung Sources, 1981, IEEE Transaction of Nuclear Science, vol. NS–28, No. 2, pp. 1786–1793.

Stephen M. Seltzer et al., Bremsstrahlung Beams from High–Power Electron Accelerators for use in Radiation Processing, 1983, IEEE Transactions of Nuclear Science, vol. NS–30, No. 2, pp. 1629–1633.

J. Paul Farrell et al., Bremmstrahlung Generators for Radiation Processing, 1983, Radiation Physics and Chemistry, vol. 22, No. 3–5, pp. 469–475.

Michael S. DeWilton, High Power, High Reliability Electron Accelerators for Industrial Processing, 1984, Radiation Physics and Chemistry, vol. 25, No. 25, Nos. 4–6, pp. 643–652.

C.C. Thompson and M.R. Cleland, High–Power Dynamitron Accelerators for X–Ray Processing, 1989, Nuclear Instrument and Methods in Physics Research, B40/41, pp. 1137–1141.

M.R. Cleland et al., Advances in X–Ray Processing Technology, 1990, Radiation Physics and Chemistry, vol. 35, Nos., 4–6, pp. 632–637.

M. R. Cleland et al., Evaluation of new X–Ray Processing Facility, 1991, Nuclear Instruments and Methods in Physics Research, B56/57, pp. 1242–1245.

M.R. Cleland, X–Ray Processing A Review of the Status and Prospects, 1993, Radiation Physics and Chemistry, vol. 42, Nos. 1–3, pp. 499–503.

J. Meissner et al., X–Ray Treatment at MeV and Above, 2000, Radiation Physics and Chemistry, vol. 57, Nos. 3–6, pp. 6547–651.

Y. Aikawa, A New Facility for X–Ray Irradiation and its Application, 2000, Radiation Physics and Chemistry, vol. 57, Nos. 3–6, pp. 609–612.

T. Watanabe, Best Use of High–Voltage, High–Powered Electron Beams:L A New Approach to Contract Irradiation Services, 2000, Radiation Physics and Chemistry, vol. 57, Nos. 3–6, pp. 635–639.

C. Artandi et al., Electron–Beam Sterilization of Surgical Sutures, Marhch 1959, Nucleonics, vol. 17, Nos. 3, pp. 86–90.

A. Brynjolfsson, Electron Irradiation Facility at the Dsanish Atomic Energy Commission Research Establishment, Riso, 1962, Ingenieren, vol. 6, No. 3, p0p. 101–104.

A. Brynjolfsson, Three–Dimensional Dose Distribution in Samples Irradiated by Electron Beams, 1963, Proceedings of the International Conference on Radiation Research, Held at the US Army Natick Laboratories, Published by the U.S. Dept. of Commerce, Office of Technical Services, pp. 116–129.

A. Brynjolfsson, Industrial Sterilization at the Electron Linear, 1963, Accelerator Facility at Risoe, Industrial Use of Large Radiation Sources STI/PUB/75, LAEA, Vienna.

E.M. Fielden et al., Dosimetry in Accelerator Research and Processing, 1970, Manual on Radiation Dosimetry, Chapter X, pp. 261–309.

P. Icre, Electronic Radiation Sterilization: Description and Operation of an Industrial Sterilization Unit, 1972, Industries Atomiques & Spatiales, vol. 5.

V.B. Osipov et al., Commercial Units for Radiation Sterilizing Medical Su0pplies, 1974, Multiscience Publication Limited, Montreal, Quebex, Canada, pp. 136–144.

C. W. Rees et al., Electron Irradiation in the Sterilization of Meat, 1976, First International Congress on Engi8neering and Food, pp. 3–25.

J.H. Bly, Electron Beam Sterilization Technology, 91979, Radiation Physics and Chemistry, vol. 143, Nos. 3–6, pp. 403–414.

T.G. Henry, Electron Beam A Cast History, 1990, Radiation Physics and Chemistry, vol. 35, Nos. 4–6, pp. 528–533.

M.R. Cleland et al., Sterilization with Accelerated Electrons, 1993, Sterilization Technology, Chapter 9, pp. 218–253.

T. Sadat, Dual Linear Accelerator System for use in Sterilization of Medical Disposable Supplies, 1991, Nuclear Instruments and Methods in Physics Research, vols. B56/57, Part II, pp. 1226–1228.

ASTM E1321–91, Standard Practice for Dosimetry in Electron and Bemsstrahlung Irradiation Facilities for Food Processing, 1991.

AAMI/American National Standard Guideline for Electron Beam Radiation Sterilization of Medical Devices, 1991.

T. Sadat, Dual Linear Accelerator System for use in Sterilization of Medical Disposable Supplies, 191, Nuclear Instruments and Methods in Physics Research, vols. b56/57, Part II, pp. 1226–1228.

ASTM E1321–91, Standard Practice for Dosimetry in Electron and Bremsstrahlung Irradiation Facilities for Food Processing, 1991.

AAMI/American National Standard: Guideline for Electron Beam Radiation Sterilization of Medical Devices, 1991.

Encyclopedia of Pharmaceutical Technology, 1992.

CH2M Hill, Conceptual Design Report–Florida Agricultural Commodities Irradiator Demonstration Project—Sep., 1987.

CH2M Hill, Options Analysis–Machine Sources for Food Irradiation, Jan., 1988.

Drawing of the Florida Agricultural Commodities Irradiation Facility, Installation Upper Level Conveyor System Layout.

Drawing of the Floridal Agricultural Commodities Irradiation Facility, Installation Upper Level Conveyor System Layour.

Map of Florida Agricultural Commodities Irradiator, Lower Level.

Brochure—The Florida Linear Accelerator.

Irradiation of Anastrepha Suspense (Ditera: Tephritidae): New Irradiation Facility, Florida Entomologis, 1993, vol. 76, No. 2.

R.A. Harrod, AECL Gamma Sterilization Facilities, 1977, Radiation Physics and Chemistry, vol. 9, pp. 91–117.

* cited by examiner

ARTICLE IRRADIATION SYSTEM SHIELDING

RELATED APPLICATION

This application is related to U.S. patent application Ser. No. 09/987,966, (now U.S. Pat. No. 6,583,423) entitled "Article Irradiation System With Multiple Beam Paths " filed concurrently on Nov. 16, 2001, the entire contents of which are hereby incorporated by reference.

BACKGROUND

1. Technical Field

The invention relates to the field of systems for irradiating articles. In particular, the invention relates to shielding for article irradiation systems.

2. Description of Related Art

Radiation is used to treat many types of articles. The types of radiation used include, for example, x-rays, gamma rays, and electron particles. The types of articles treated with radiation are many and varied. For example, radiation is used to treat silicon chips, polymers, medical devices, and, more recently, food products. For example, the Food and Drug Administration and the Center for Disease Control have both supported the irradiation of food products for controlling or eliminating microorganisms in food products.

Irradiation systems often employ high levels of radiation to treat articles, with article irradiation being performed in a cell area surrounded by radiation shielding. The radiation is generated by a radiation source housed within the irradiation system. During irradiation, products are typically conveyed into an irradiation system on a conveyor system or other continuous loading system, the loading system transporting articles through the cell area for irradiation, and then out of the irradiation system for unloading. Many states regulate the emission of radiation from irradiation systems, and the radiation shielding is designed to control emissions so that they conform to government requirements.

In order to conform to emission requirements, one type of conventional irradiation system utilizes a "poured in place" steel-reinforced concrete design as a radiation shield. Poured in place structures, while effective in controlling the escape of radiation, are large and time-consuming to construct. For example, when using concrete fill, radiation shield wall thicknesses of up to 12 feet may be required. In addition, the steel-reinforced concrete structures are permanent structures, which limits the flexibility of the site housing the irradiation system.

The use of large, permanent shield structures is aggravated by the need to shield certain parts of the irradiation system, such as the continuous loading system, the cell area, and the radiation source. The parts of the irradiation system occupy a large surface area at the irradiation site, and the requirement for a large irradiation site results in high overhead costs.

A permanent shield structure is also impedes access to the interior of the irradiation system. It may therefore be necessary to remove certain elements within the shield structure by crane, or other lifting device.

There is therefore a need for an irradiation system that occupies a reduced area. There is also a need for an irradiation system that provides flexibility for the site housing the irradiation system, and for ease of access to the interior of the irradiation system.

SUMMARY OF THE INVENTION

The present invention overcomes the shortcomings of the conventional art and may achieve other advantages not contemplated by conventional devices.

According to a first aspect of the invention, an irradiation system includes a radiation source arranged to emit a radiation beam along at least one beam path extending from the radiation source, with an inner shield disposed around the radiation source for attenuating radiation generated by the radiation source, and the beam path extending through at least one path aperture in the inner shield. A first conveyor system is provided for transporting articles through the beam path, and an outer shield is disposed around the inner shield and the first conveyor system for attenuating radiation generated by the radiation source.

According to the first aspect, radiation generated by the radiation source must escape frorn both the inner shield and the outer shield in order to escape the irradiation system. The first conveyor system is disposed between the inner shield and the outer shield, which reduces the total space occupied by the irradiation system.

According to a second aspect of the invention, an irradiation system is arranged in an upper level and a lower level, the system including a radiation source in the upper level arranged to emit radiation along first and second beam paths for irradiating articles on the upper level, and to emit radiation along a third beam path for irradiating articles on the lower level. An upper level shield is disposed around the radiation source for attenuating radiation generated by the radiation source, and a first conveyor system is provided for transporting articles through the first and second beam paths. On the lower level, a second conveyor system transports articles through the second beam path.

According to the second aspect, the radiation source can irradiate articles on both an upper level and a lower level of the irradiation system, which reduces the space required for the irradiation system. In addition, the shield requirements of the irradiation system are reduced due to the arrangement of the irradiation system into an upper and a lower level.

According to a third aspect of the invention, a method of removing a radiation source from an irradiation system includes disconnecting a removable module of an outer shield from the outer shield, disconnecting a removable module of an inner shield from the inner shield, and removing the radiation source from the irradiation system through openings left by the removable modules.

According to the third aspect, the irradiation source can be laterally removed from the irradiation system, without removing permanent walls or other fixed structures. Lateral removal through the inner and outer shields avoids the more difficult method of vertical removal using cranes or similar lifting devices.

Other aspects and advantages of embodiments of the invention will be discussed with reference to the figures and to the detailed description of preferred embodiments.

BRIEF DESCRIPTION OF THE DRAWING FIGURES

DETAILED DESCRIPTION

An irradiation system will be described below by way of preferred embodiments and with reference to the accompanying drawings.

Figure 1:
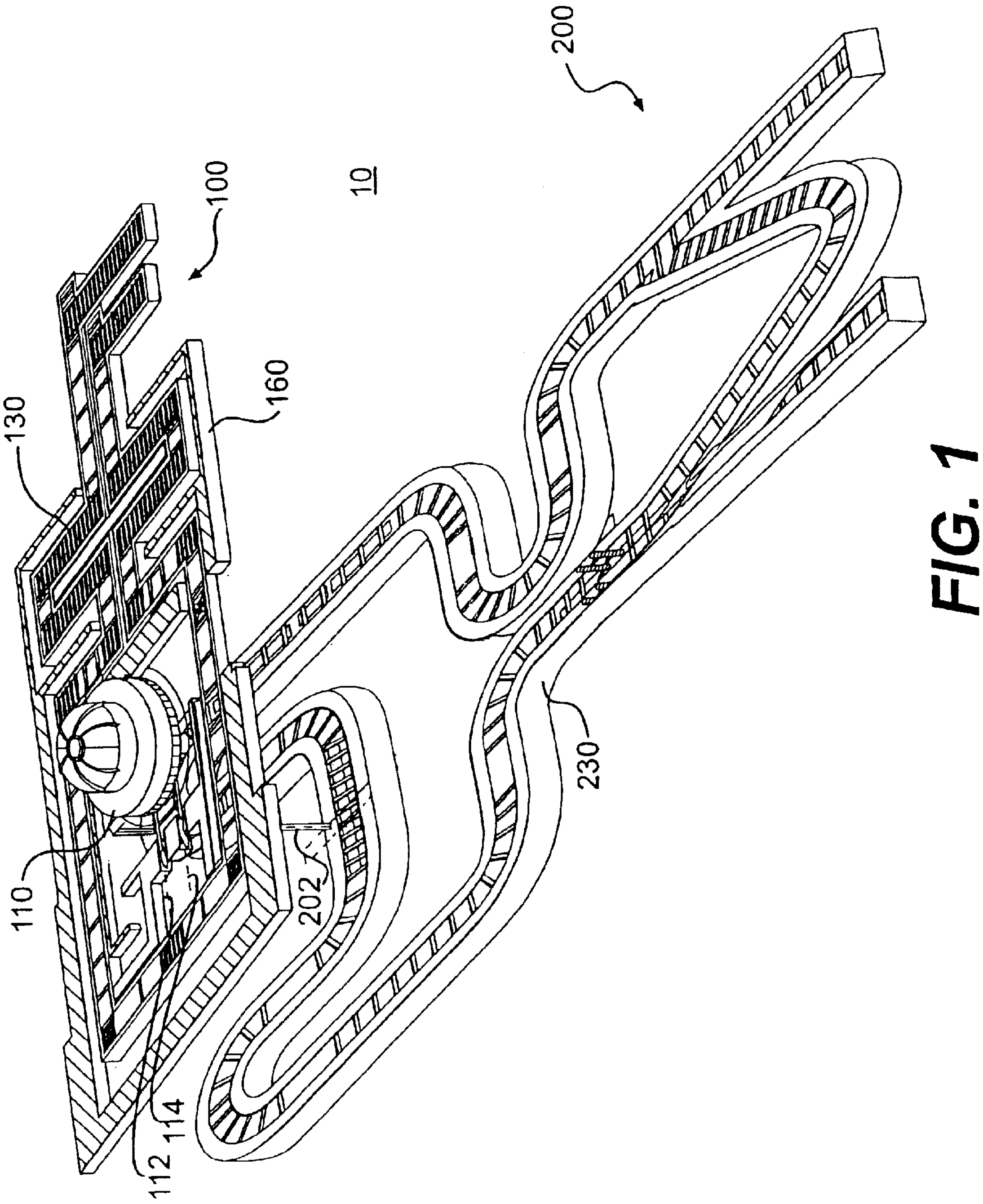
FIG. 1 is an elevated perspective schematic view of an irradiation system according to an embodiment of the invention.

FIG. 1 is a schematic view of an irradiation system 10 arranged into an upper level 100 and a lower level 200. The upper level 100 of the irradiation system 10 includes a radiation source 110, an upper level conveyor system 130 for conveying articles to be irradiated, and an upper level shield 160 for attenuating radiation emitted by the radiation source 110. The lower level 200 includes a lower level conveyor system 230 for conveying articles to be irradiated on the lower level 200. For the purposes of illustration, the upper level shield 160 is shown schematically, and the shielding for the lower level 200 is omitted from FIG. 1.

In general, the irradiation system 10 is capable of irradiating articles on both the upper level 100 and the lower level 200. In the upper level 100, articles are irradiated by conveying them on the upper level conveyor system 130 through a first beam path 112 and a second beam path 114 of the radiation source 110. In the lower level 200, articles are irradiated by conveying them on the lower level conveyor system 230 through a third beam path 202, the third beam path 202 extending generally vertically downward from the radiation source I 10. The upper level conveyor system 130 and the lower level conveyor system 230 can operate independently to convey articles on their respective levels, and the first, second and third beams can be selectively generated by the radiation source 110, depending upon the irradiation operation to be performed.

The radiation source 110 can be any source for emitting radiation along a beam path to irradiate an article. A preferred radiation source is the Rhodotron TT300 accelerator, manufactured by Ion Beam Applications, and described by publication "RHODOTRON TT 300 10 MEV/150 LW PRODUCT DESCRIPTION MANUAL," available from Ion Beam Applications, Chicago, Ill. This types of radiation source emits radiation regulated by state governments, and therefore shielding is required to prevent the escape of radiation from the irradiation system 10. The upper level shield 160 according to the present invention performs part of the shielding function for the irradiation system 10, and the configuration of the upper level shield 160 is discussed below with reference to FIG. 2.

Figure 2:
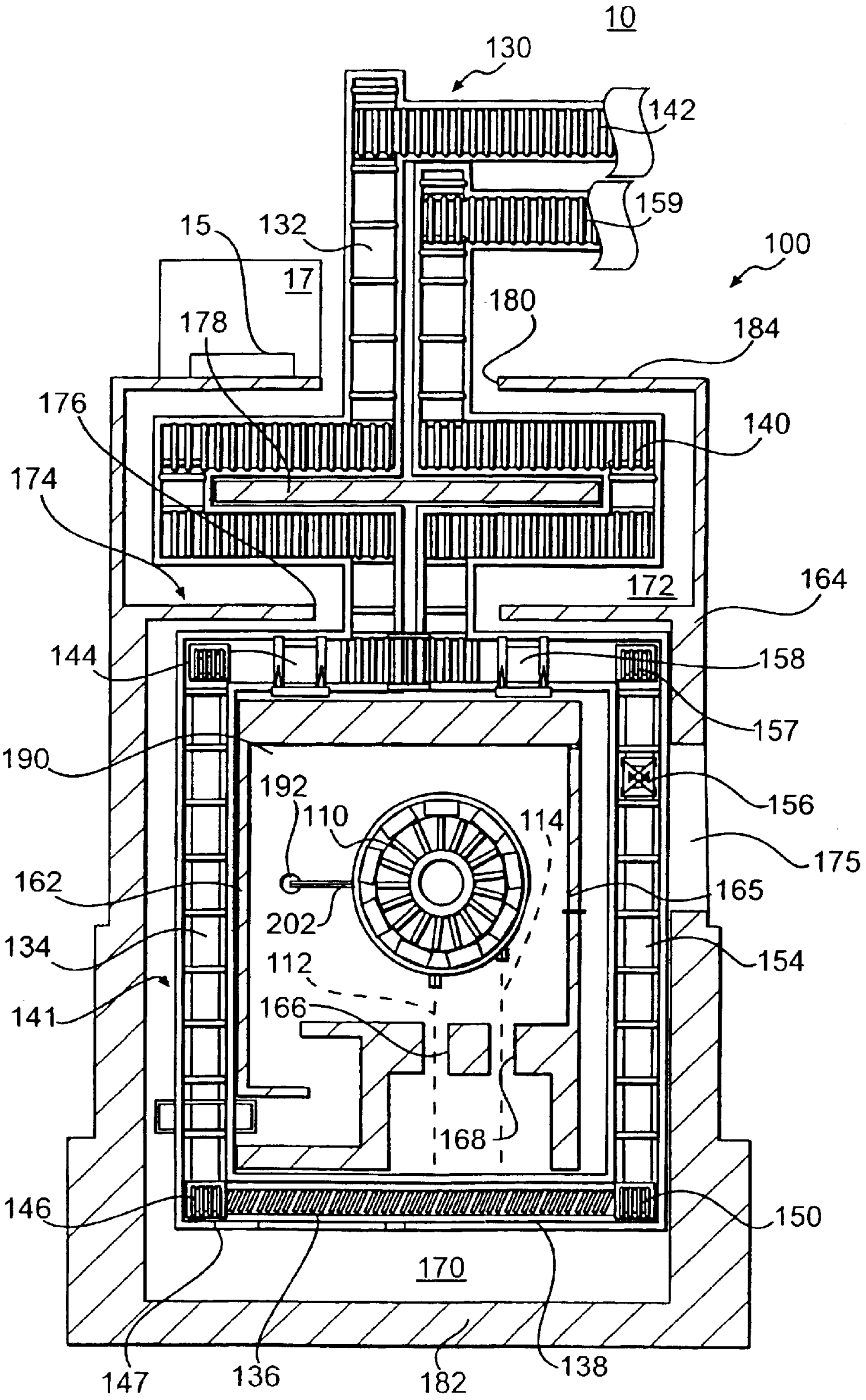
FIG. 2 is a schematic view of the upper level of the irradiation system of FIG. 1.

FIG. 2 is a schematic view of the upper level 100 of the irradiation system 10. The upper level 100 is configured to irradiate articles with beams emitted along either of the first or second beam paths 112, 114. The radiation source 110 may emit, for example, a first x-ray beam along the first beam path 112, and a second x-ray beam along the second beam path 114. The first and second beams may be of relatively high energy, with beam power falling, for example, in the MeV range. The radiation source 110 is also capable of emitting a third beam of radiation along the third beam path 202. The third beam can be, for example, an electron beam ("e-beam"). The third beam can be directed downwardly using magnets, for example, in order to irradiate articles on the lower level 200.

The upper level conveyor system 130 is preferably a floor-mounted system and includes an entry conveyor 132, a transport conveyor 134, a roller flight conveyor 136, a beam pass conveyor 138, and an exit conveyor 140. The transport conveyor 134, the roller flight conveyor 136, and the beam pass conveyor 138 are arranged so as to form a process loop 141 around the radiation source 110.

Articles are transported into the irradiation system 10, through the first and second beam paths 112, 114, and out of the irradiation system 10, in the following manner: Articles to be irradiated are loaded into totes at a load station 142, and are then conveyed to the entry conveyor 132, which conveys the totes to the transport conveyor 134. A tote stacker 144 in the transport conveyor 134 then stacks the totes in groups of two, one tote on top of another tote. The transport conveyor 134 conveys the tote stacks from the tote stacker 144 to the roller flight conveyor 136, where the totes pass through the first and second beam paths 112, 114. The transport conveyor 134 conveys totes on a roller flight chain (not shown), and a lifting device 146 is positioned at a 90° turn 147 in order to raise the tote stacks above the roller flight chain. Powered rollers propel the tote stacks to the roller flight conveyor 136, which is at the same elevation as the raised tote stacks on the lifting device 146.

The roller flight conveyor 136 extends from the lifting device 146 to the beam pass conveyor 138. The beam pass conveyor 138 transports tote stacks past the first and second beam paths 112, 114 to a 90° turn 150. The beam pass conveyor 138 may be a variable speed conveyor coordinated with the radiation source 110, so that the speed of the beam pass conveyor 138 adjusts to variations in the radiation beam strength of the radiation source 110. A back end 154 of the process loop 141 includes a turntable 156 for rotating totes. The turntable 156 preferably rotates totes by 180°, so that both sides of the articles can be irradiated. It is also possible to rotate totes at any angle, such as, for example, 90° or 60°, and to repeatedly pass the totes through the first and second beam paths 112, 114.

The transport conveyor 134 conveys the tote stacks around another 90° turn 157 to the tote destacker 158. The upper level conveyor system 130 can send totes through the process loop 141 any number of times, and the tote destacker 158 advantageously separates a tote stack into individual totes by lifting the upper tote of a tote stack and allowing the lower tote to exit the tote destacker 158, ensuring that the lower tote of a tote stack becomes the upper tote and the upper tote becomes the lower tote in a subsequent pass through the tote stacker 144. Alternatively, the totes can be conveyed out of the process loop to the exit conveyor 140, which conveys the totes to an unload station 159.

A control system 15 is provided within a control room 17 for controlling the radiation source 110 and the upper and lower level conveyor systems 130, 230. The control system 15 may include, for example, a programmable logical controller (PLC) connected to actuators (not shown) for operating the upper and lower level conveyor systems 130, 230.

The PLC is also connected to the radiation source 110 for controlling its operation. The control system 15 includes an operator interface connected to the PLC, so that an operator can input data and/or oversee operation of the irradiation system 10. The PLC may also be encoded with safety routines that are responsive to sensors (not shown) disposed within the radiation system 10. The sensors can be arranged to sense such occurrences as, for example, door openings, overheating, smoke, roof plug openings, and other occurrences within the irradiation system 10.

Totes may be irradiated in the irradiation system 10 in batches. Batches are processed using parameters for rotation, beam current, process speed and other operating parameters which are set prior to batch loading. The operator can set the operating parameters in many ways. For example, the operator can utilize preprogrammed batch instructions stored in the control system 15, or the operator can manually enter batch instructions. Batch instructions can also be. downloaded from a computer readable medium, or from a remote site via, for example, the Internet. Batches of various sizes can be irradiated by the irradiation system 10. Suitable batch sizes can be, for example, 14 or 28 totes.

In the irradiation system 10, the radiation source 110 can emit relatively powerful beams along the first, second, and third beam paths 112, 114 and 202. For example, the radiation source 110 can emit x-ray beams in the MeV range, and e-beams in the MeV range. Therefore, the upper level shield 160 is configured to maintain the escape of radiation from the irradiation system 10 within acceptable levels. It is also desirable to provide an upper level shield 160 that does not occupy excessive space, and that may be removable from a site.

As schematically illustrated in FIG. 2, the upper level shield 160 includes an inner shield 162 and an outer shield 164. Both the inner shield 162 and the outer shield 164 may be constructed of modules, which are discussed in detail below with reference to FIG. 510. The inner shield 162 extends around the radiation source 110, and includes a first path aperture 166 and a second path aperture 168 for allowing radiation beams from the radiation source 110 to travel along the first and second beam paths 112, 114, respectively. The inner shield 162 also includes a removable module 165, which faces a removable module 175 of the outer shield 164. When the removable modules 165, 175 are removed from the upper level shield 160, the radiation source 110 can be removed from the irradiation apparatus 10 through the openings left in the inner and outer shields 162, 164. An embodiment of a removable module is discussed below with reference to FIG. 10.

The outer shield 164 is generally divided into a first chamber 170 and a second chamber 172, with a dividing wall 174 disposed between the first and second chambers 170, 172. The entry and exit conveyors 132, 140 extend through an opening 176 in the dividing wall 174, around a wall 178 in the second chamber 172, and through an opening 180 in the outer shield 164.

As illustrated in FIG. 2, the first and second beams of radiation emitted by the radiation source 110 are emitted at one end of the upper level shield 160, and the opening 180 in the outer shield 164 is at an opposite end of the upper level shield 160. This arrangement reduces the escape of radiation from the first and second beams from the upper level shield 160. There are also several corners in the first chamber 170 that the radiation must reflect off of before escaping into the second chamber 172 through the opening 176. The inclusion of corners in the first chamber 170 is facilitated by arranging the upper level conveyor system 130 into the process loop 141 extending around the inner shield 162.

The inner and outer shields 162, 164 should be constructed of materials having radiation attenuative properties, such as steel, iron, and other dense materials, so that each impingement of radiation against the inner and outer shields 162, 164 attenuates the radiation emitted by the radiation source 110.

The opening 176 in the dividing wall 178 is on an opposite side of the inner shield 162 as the first and second path apertures 166, 168. Therefore, in order to escape the upper level shield 160, radiation from the radiation source 110 must first reflect off of a first end wall 182 of the outer shield 164, travel through the space between the inner and outer shields 162, 164, and then through the opening 176. The wall 178, which is parallel to the dividing wall 174 and a second end wall 184 of the outer shield 164, is another attenuative surface that radiation must reflect off of before escaping through the opening 180 in the outer shield 164. The multiple attenuative surfaces and corners that radiation must reflect off of greatly reduces the amount of radiation escaping through the opening 180 of the outer shield 164.

Figure 11A:
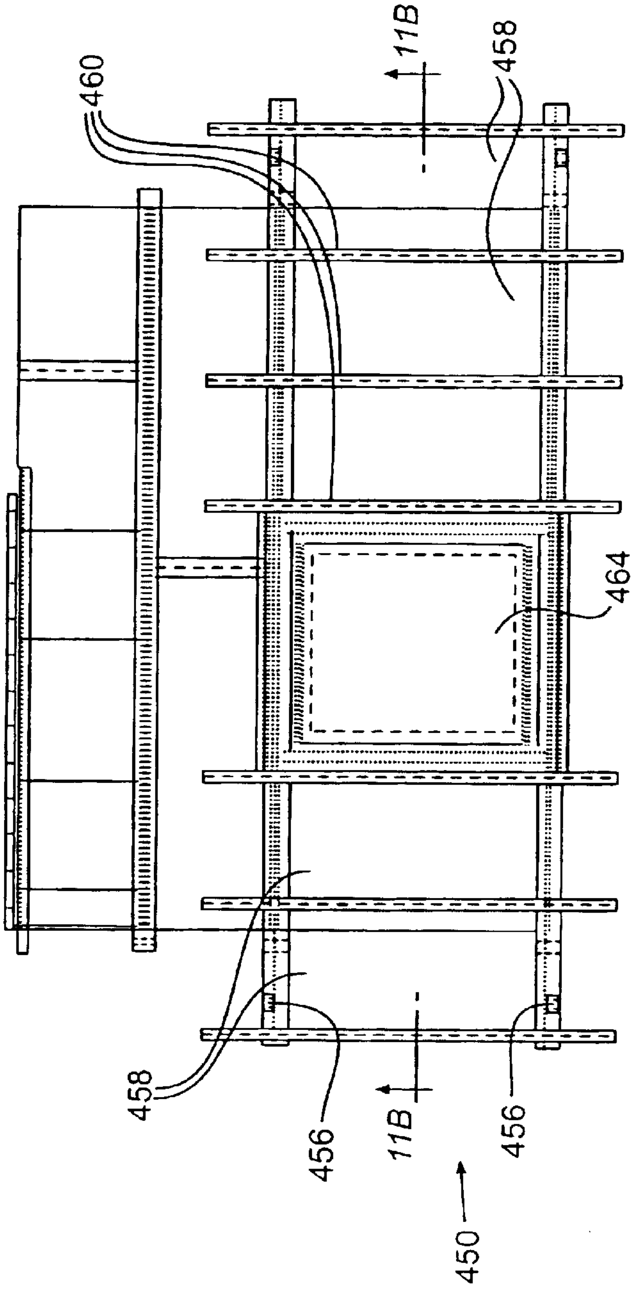
FIG. 11A is top view of a section of a ceiling assembly according to an embodiment of the present invention.

The upper level shield 160 of the irradiation system 10 also includes a it ceiling assembly, which is discussed below with reference to FIGS. 11A and 1 I B. The upper level 100 rests upon a floor 190 having an aperture 192 through which the third beam path 202 extends. The floor 190 may be, for example, a concrete foundation. A third beam can be emitted from the radiation source I 10 and guided along the third beam path 202 using, for example, magnets, and directed onto trays conveyed on the lower level conveyor system 230, as illustrated by FIG. 3A.

Figure 3A:
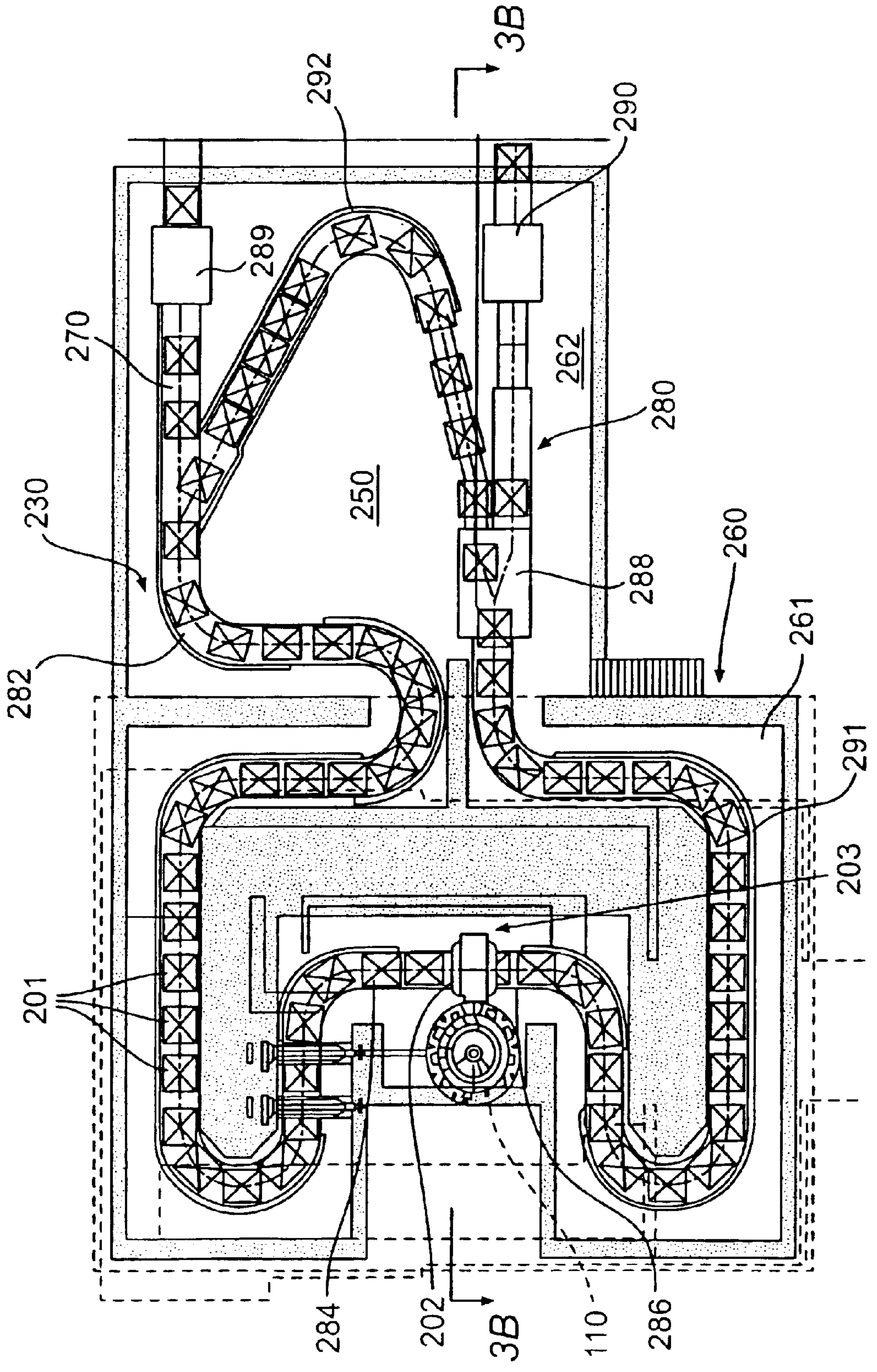
FIG. 3A is a top plan schematic view of the lower level of the irradiation system of FIG. 1.
Figure 3B:
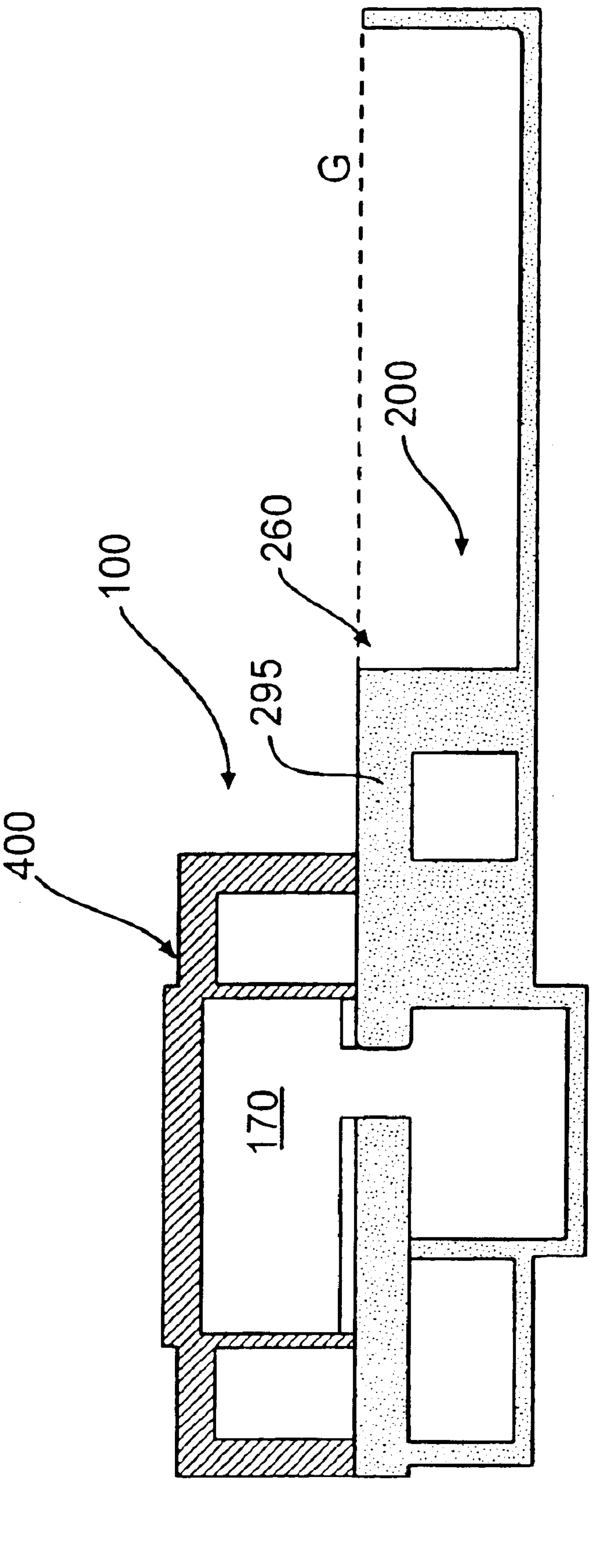
FIG. 3B is a sectional view taken along line 3B—3B in FIG. 3A.

FIG. 3A is a top plan schematic view of the lower level 200 of the irradiation system 10. The lower level 200 includes the lower level conveyor system 230 surrounded by a lower level shield 260. On the lower level 200, articles are conveyed on trays 201 on the lower level conveyor system 230, and are irradiated by passing through the third beam path 202. The lower level 200 is preferably at least partially below ground level G, as illustrated by FIG. 3B, and the top of the lower level 200 can, for example, approximately coincide with ground level G. In FIG. 3A, a depiction of the radiation source 110, which is located on the upper level 100, is superimposed on the lower level 200 for illustrative purposes.

The lower level 200 is configured to irradiate articles using the third beam from the radiation source 110. For irradiation, articles are loaded onto trays and conveyed by the lower level conveyor system 230 through the third beam path 202 for irradiation by the downwardly projected third beam. The lower level conveyor system 230 is floor mounted and contains a process loop 250, an entry conveyor 270, and an exit conveyor 280. The process loop 250 includes a transport conveyor 282, a small roller flight conveyor 284, and a beam pass conveyor 286. At one end, the transport conveyor 282 connects to the small roller flight conveyor 284, and, at another end, to the beam pass conveyor 286. The transport conveyor 282 also intersects with the entry conveyor 270 and the exit conveyor 280. The roller flight conveyor 284 connects with the beam pass conveyor 286 to complete the process loop 250. The entry conveyor 270 connects a lowerator 289 with the process loop 250, the lowerator 289 serving to load trays from the load station 142 located on the upper level 100 to the lower level conveyor system 230. An elevator 290 raises trays of irradiated articles to the unload station 159 located on the upper level 100. The lowerator 289 and the elevator 290 may be, for example, "Z-lifters."

The exit conveyor 280 connects the elevator 290 with the process loop 250 at a reroute junction 288. The reroute junction 288 is configured to direct trays to either the exit conveyor 280, or back to the process loop 250 for another irradiation process. Trays enter the process loop 250 at the transport conveyor 282, and are conveyed to the small roller flight conveyor 284, which operates similarly to the roller flight conveyor 136 of the upper level conveyor system 130. The process loop 250 can also include spacing sections to ensure the trays are properly spaced before entering the beam pass conveyor 286. The beam pass conveyor 286 conveys trays under the third beam path 202. The beam pass conveyor 286 includes two parallel chains (not shown) which extend from the roller flight conveyor 284, under the third beam path 202 to the transport conveyor 282. Trays are conveyed by the beam pass conveyor 286 to a back end 291 of the transport conveyor 282, which conveys trays to the reroute junction 288. At the reroute junction 288, trays are directed to either the exit conveyor 280, or back to the transport conveyor 282 via a reroute track 292 for another pass under the third beam path 202. Trays can be subjected to as many irradiations as required, and are cooled by circulating the irradiated trays around the process loop 250 with the third beam turned off. After the trays have been processed and/or have sufficiently cooled, they are directed to the exit conveyor 280 and raised to the upper level 100 by the elevator 290.

The third beam may be, for example, a 5, 7, or 10 MeV e-beam, and the lower level 200 is therefore shielded by the lower level shield 260. The lower level shield 260 may be constructed of, for example, bulk construction materials, such as concrete and steel. While the term lower level "shield" is employed in this specification, the lower level shield 260 is also the structure which forms the lower level 200. One advantage to locating the lower level shield 260 below ground level G (see FIG. 3B) is that when the irradiation system 10 is disassembled, the components in the lower level 200 can be removed, and the lower level shield 260 can simply be filled with material such as earth, concrete, or other fill materials. The site housing the irradiation system 10 can then be utilized for other purposes.

The lower level shield 260 is generally divided into a first chamber 261 and a second chamber 262, with the third beam path 202 extending into the first chamber 261 and intersecting the beam pass conveyor 286. The lower level shield 260 prevents the escape of radiation through the sides and bottom of the irradiation system 10. Advantageously, as shown in FIGS. 3A and 3B, the upper level shield 160 (the outline of the upper level shield 160 is illustrated by dotted lines in FIG. 3A) is located above the first chamber 230, so that radiation passing through a ceiling 295 of the lower level 200 passes upward into the first chamber 170 of the upper level shield 160. The upper level shield 160 is shielded from above by a ceiling assembly 400 which is discussed below with reference to FIGS. 11A and 11B, which serves to attenuate radiation from both the upper level 100 and the lower level 200. Therefore, the shielding requirement for the ceiling 295 of the lower level 200 is reduced. Also, by locating the lower level 200 below the upper level 100, the total area occupied by the irradiation system 10 is reduced.

Figure 4:
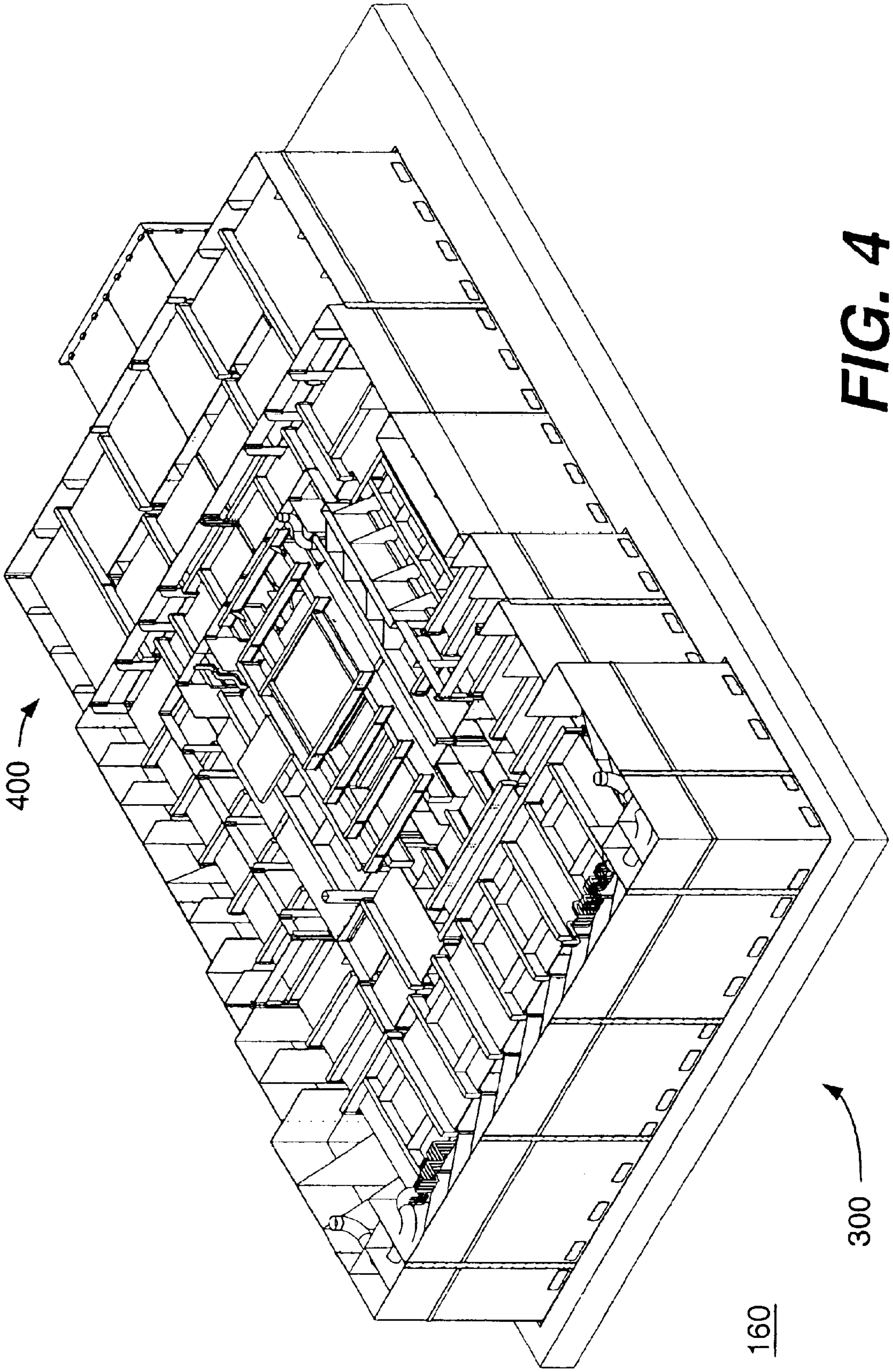
FIG. 4 is an isometric view of an upper level shield according to an embodiment of the invention.

FIG. 4 is an isometric view of the upper level shield 160 according to an embodiment of the invention. In general terms, the upper level shield 160 is constructed of a series of interconnected removable modules, forming a modular wall structure 300. The modules are hollow, and each module is filled with ballast material for attenuating radiation after the modules have been connected. The modules forming the modular wall structure 300 are discussed in further detail below. A ceiling assembly 400 of the upper level shield 160 is supported on the modular wall structure 300 for attenuating radiation, and is also filled with ballast material (not shown).

Figure 5:
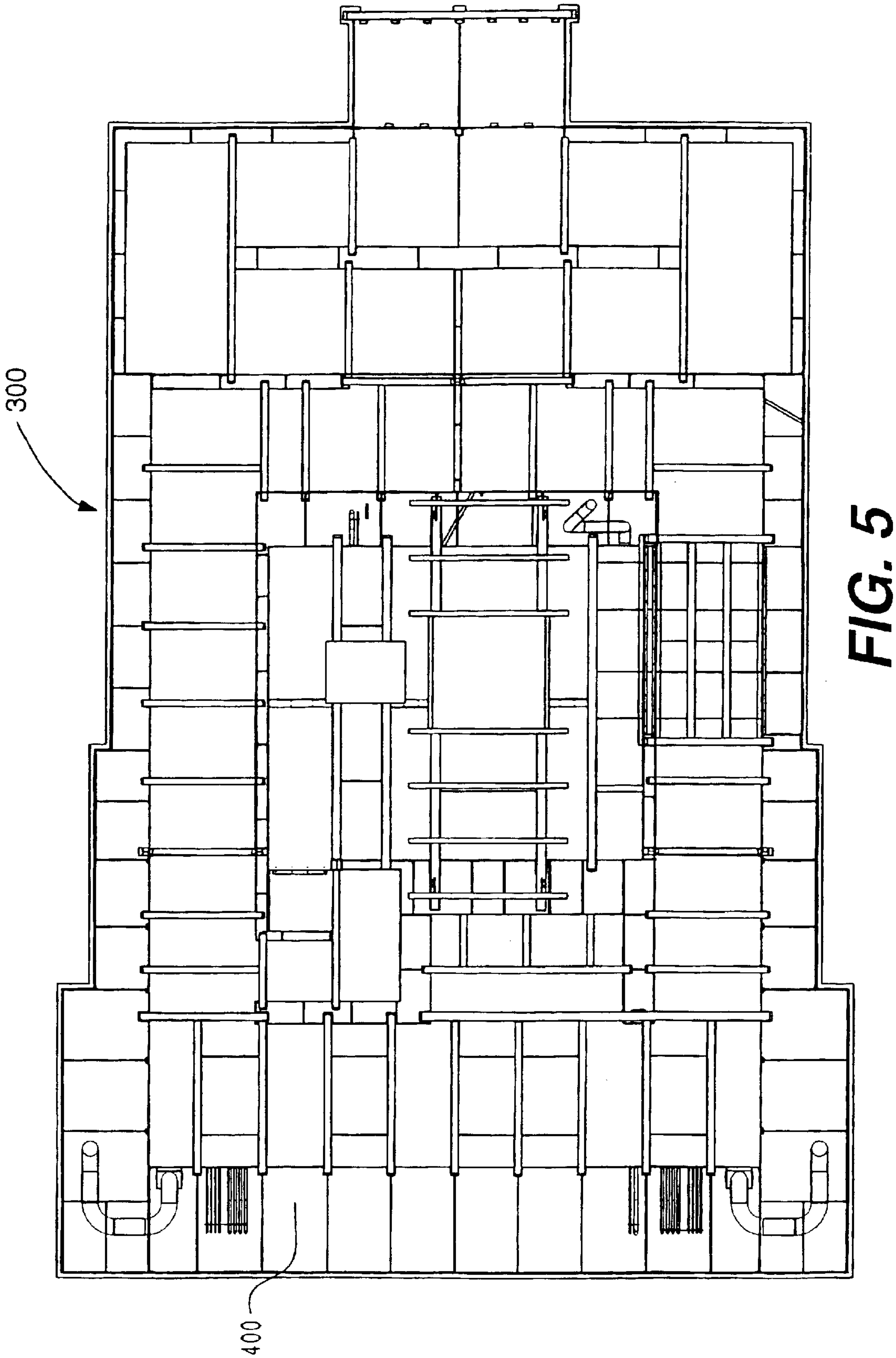
FIG. 5 is a top view of the upper level shield of FIG. 4.
Figure 6:
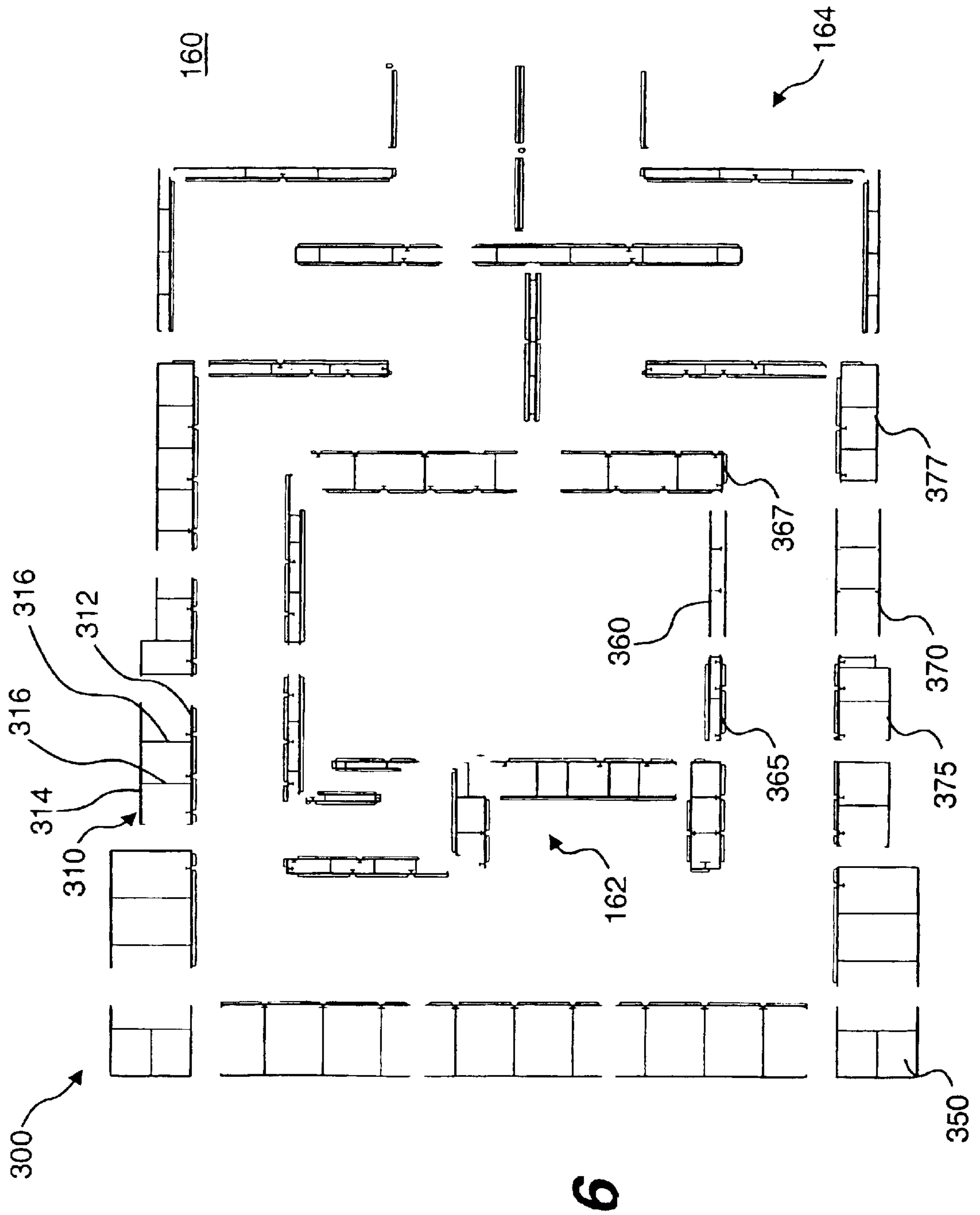
FIG. 6 is a partial exploded view of the upper level shield of FIG. 4.

FIG. 5 is a top view of the upper level shield 160 of FIG. 4, and FIG. 6 is a partial exploded view of the modular wall structure 300 of the upper level shield 160. As illustrated by FIG. 6, several modules of differing configurations form the modular wall structure 300. An exemplary module 310 is shown in FIG. 6 for the purpose of illustration.

The module 310 is essentially a hollow structure formed by an inner plate 312, an outer plate 314, and a plurality of dividers 316 located between the inner and outer plates 312, 314. The space between the inner and outer plates 312, 314 is provided to house ballast material for attenuating radiation. The module 310 can be constructed of steel, preferably a mild steel, such as ASTM A36, that can be welded or otherwise joined together offsite. The plates 312, 314, 316, may be plates of, for example, between ½"–1" thickness. Each of the modules illustrated in FIG. 6 can be fabricated offsite, and shipped to the site for construction of the upper level shield 160. This feature provides for quick construction of the upper level shield 160.

Figure 7:
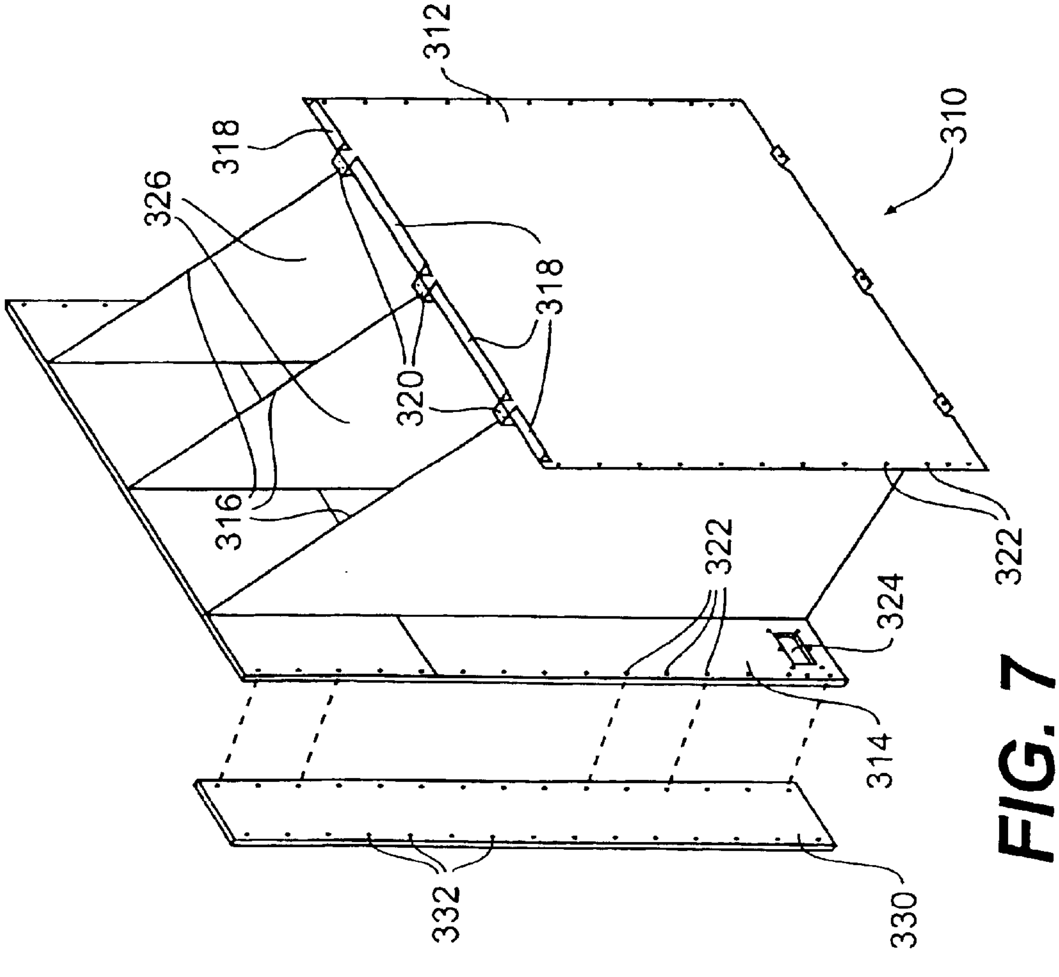
FIG. 7 is a perspective view of a module according to an embodiment of the present invention.

FIG. 7 is a perspective view of the module 310. As shown in the perspective view, the module 310 is higher at the outer plate 314 than at the inner plate 312. The high outer plate 314 of the module 310 supports a layer of ballast (not shown) of the ceiling assembly 400. The module 310 also forms a part of the support structure for the ceiling assembly 400, and includes columns 320 for supporting the ceiling assembly 400, and angle surfaces 318 for attachment to the ceiling assembly 400.

The inner and outer plates 312, 314 each include several bolt holes 322 at their edges. The bolt holes 322 are used to connect the module 310 to an adjacent module using a connecting plate 330. In order to connect the module 310 with an adjacent module, the modules are simply placed next to one another so that the their inner plates abut, and their outer plates abut. The connecting plate 330 has two longitudinally extending rows of bolt holes 322, one row being bolted to one module, and one row being bolted to an adjacent module. A connecting plate 330 is used at each end of the inner plate 312, and at each end of the outer plate 314, to connect the module 310 to adjacent modules. When modules are joined at corners, a connecting plate bent at a right angle can be used to connect the modules.

When the modules of the outer shield 164 have been connected, they form a hollow "shell" for housing ballast material. The ballast material can comprise material such as, for example, steel shot, steel shavings from industrial processes, and other forms of metallic particulate material or punchings. One preferred form of metallic waste is shavings from nail machining, known as "nail beards." It is particularly advantageous to use steel shavings or waste from industrial machining processes because this material is typically coated with some form of lubricant. The lubricant on the machined metallic waste allows the ballast material to flow easily into and out of the upper level shield 160, and inhibits rust in the ballast. In general, preferred ballast material has a density of greater than 250 pounds per cubic foot. The use of higher density ballast reduces the required thickness for the modules of the upper level shield 160.

The ballast material can be poured into the upper level shield 160 using, for example, a fork lift having barrel attachment, or a crane with an attached hopper. When the irradiation system 10 is to be disassembled, the ballast material can be drained from each module through ports in the modules. For example, the module 310 includes several ports 324 (one is shown in FIG. 7). At least one port 324 should be present in the outer plate 314 for each space 326 between two dividers 316, so that each individual space 326 can be selectively drained of ballast material. The ports 324 can be opened or closed using a removable cover that can be bolted or screwed to holes disposed around the ports 324.

The dividers 316 between the inner and outer plates 312, 314 serve the important function of dividing the module 310, and consequently, the entire modular wall structure 300, into the discrete spaces 326 for housing ballast material. This allows selected modules to be drained of ballast and removed from the modular wall structure 300, without affecting the ballast in other modules.

The modules of the modular wall structure 300 are filled to near capacity with ballast, which creates a large positive pressure in the interior of the modules. The dividers 316 are therefore spaced to provide necessary stiffness to support the weight of ballast material housed in the spaces 326. A desirable spacing of dividers 316 is, for example, approximately four feet. If a larger spacing is used, the thicknesses of the inner and outer plates 312, 314 may need to be increased to ensure sufficient module stiffness under the weight of the ballast.

Figure 8:
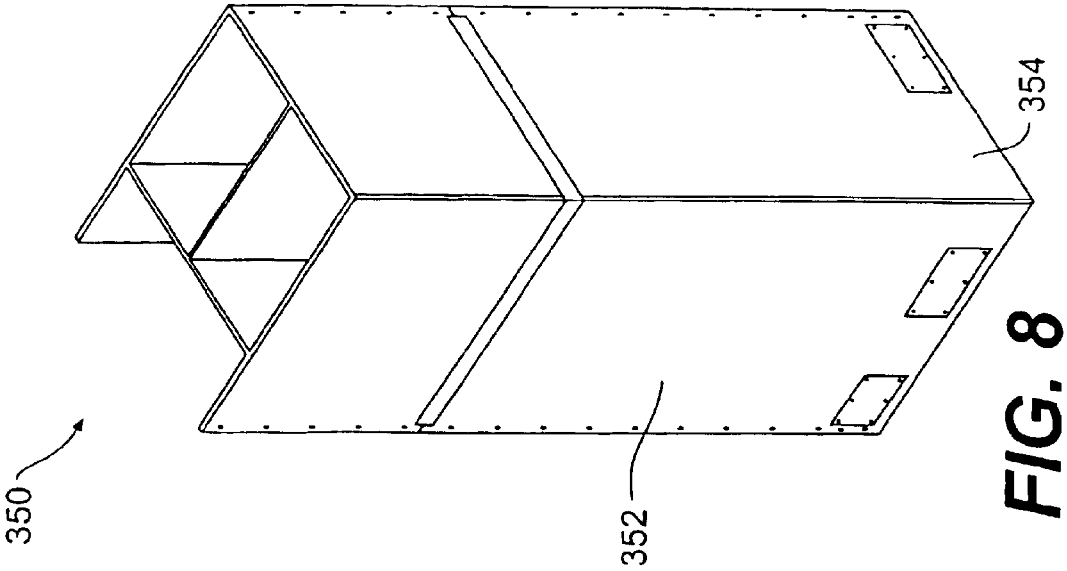
FIG. 8 is a perspective view of a corner module according to an embodiment of the present invention.

FIG. 8 is a perspective view of a corner module 350 according to an embodiment of the present invention. The corner module 350 includes a first outside plate 352 and a second outside plate 354, and is used at corners of the module structure 300 (see FIG. 6).

Figure 9:
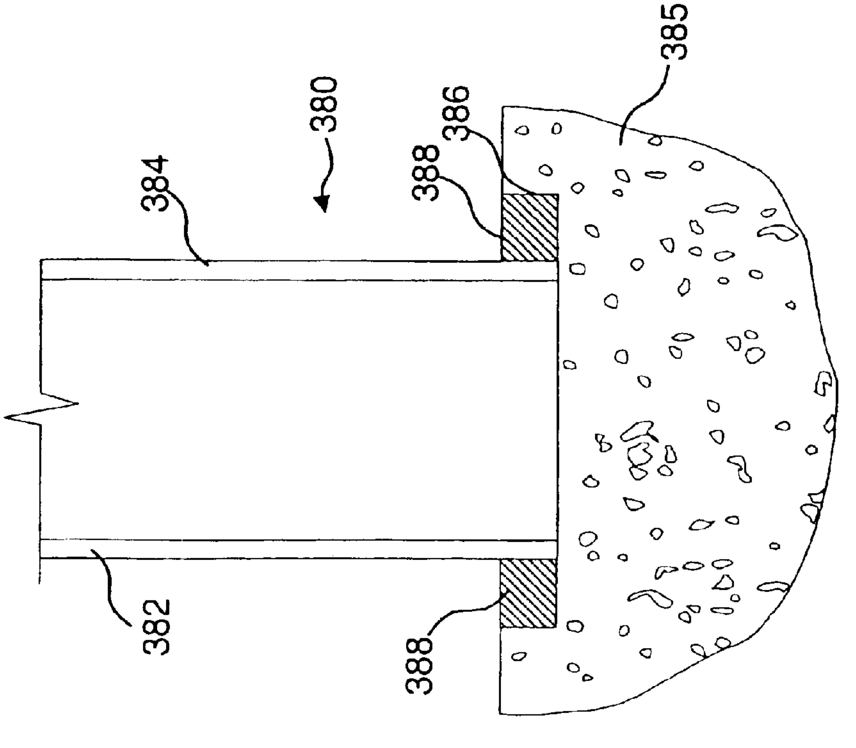
FIG. 9 is a sectional view of a mounting arrangement for modules according to an embodiment of the present invention.

FIG. 9 is a sectional view of a mounting arrangement for modules according to an embodiment of the present invention. In FIG. 9, a module 380 is mounted within a trench 386.

The trench 386 is provided in a foundation 385 so that ballast material stored in the module 380 does not escape from the bottom of the module 380. The foundation 385 can be, for example, a concrete foundation. The trench 386 is of a width extending outward from an inner plate 382 and an outer plate 384 of the module 380, which allows for grout 388 to be filled in the gap between the walls of the trench 386 and the inner and outer plates 382, 384. The grout 386 securely retains the ballast material in the module 380, and prevents the module 380 from shifting. The grout 388 is also relatively easy to remove when the upper level shield 160 is to be disassembled. The module 380 can include one or more flanges (not shown) with bolt holes, which allows the module 380 to be secured in the trench 386 using, for example, concrete anchor bolts.

As illustrated by FIG. 6, the modular nature of the upper level shield 160 allows for complete disassembly and removal of the upper level shield 160. In addition, an inner removable module 360 and an outer removable module 370 can be included in the inner and outer shields 162, 164, respectively, to allow for removal of the radiation source 110 from the irradiation system 10.

Figure 10:
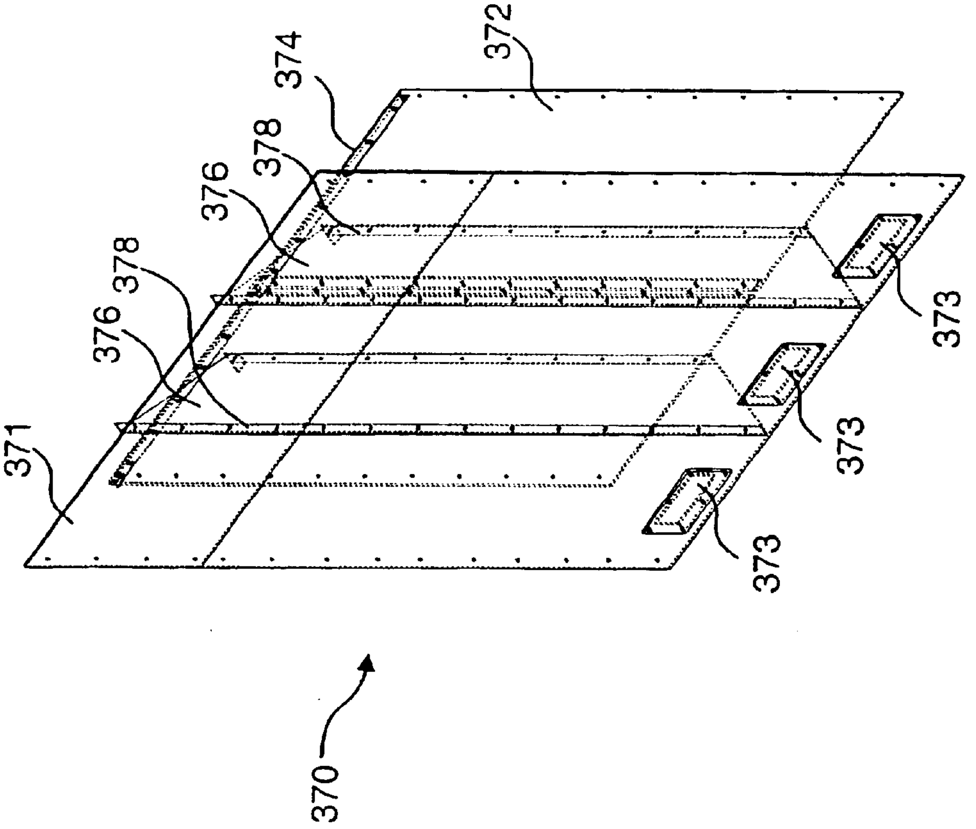
FIG. 10 is a perspective view of a removable module according to an embodiment of the present invention.

The outer removable module 370 of the inner shield 162 is illustrated by FIG. 10. The inner removable module 360 may have a similar configuration. The inner removable module 360 and the outer removable module 370 are preferably oriented in the upper level shield 160 so that the radiation source 110 can be easily transported through openings left in the upper level shield 160 when the removable modules 360, 370 are disconnected from the upper level shield 160.

The process for removing the inner and outer removable, modules 360, 370 is discussed below with reference to FIGS. 6 and 10.

First, the ballast material in the outer removable module 370 is drained by removing covers 373 from ports in the outer removable module 370. Next, an outer plate 371 of the outer removable module 370 is unbolted from the outer plates of adjacent modules 375, 377. The outer plate 371 can overlap the outer plates of the adjacent modules 375, 377, and includes bolt holes which align with bolt holes in the adjacent outer plates of the adjacent modules 375, 377. After the outer plate 371 is unbolted from the adjacent modules 375, 377, dividers 376 are unbolted from plates 378. The plates 378 are welded to the interior of the outer plate 371, and to the interior of the inner plate 372, and include bolt holes that coincide with bolt holes in the dividers 376. The outer removable module 370 is preferably of a width such that a technician can descend into the interior of the outer removable module 370, and unbolt the dividers 376 from the plates 378. The outer plate 372 and the dividers 376 are then removed from the outer shield 164.

The inner plate 372 is removed by unbolting overlap portions of the inner plate 372 from inner plates of the adjacent modules 375, 377. Also, an angle surface 374 of the inner plate 372, which may be, for example, bolted to the ceiling assembly 400, is disconnected from the ceiling assembly 400. The inner plate 372 is now disconnected from the adjacent modules 375, 377, and may be removed from the outer shield 164. Removing the inner plate 372 exposes an opening in the outer shield 164.

The inner removable module 360 is then removed from the inner shield 162. The inner removable module 360, which is not illustrated in detail, can be removed in a manner similar to that of the outer removable module 370. First, ports in an outer plate are opened and ballast material is drained from the inner removable module 360. Next, overlap portions of an outer plate of the inner removable module 360 are unbolted from adjacent modules 365, 367. Dividers are then unbolted from plates welded to an inner plate and to the outer plate. The outer plate and the dividers are then removed from the upper level shield 160. Lastly, connections to the ceiling assembly 400, which may be flanges, angles, and other attachment members on the inner plate, are disconnected from the ceiling assembly 400. The inner plate is unbolted from adjacent inner plates, and the inner plate is moved through the opening in the outer shield 164 and out of the irradiation system 10. Removal of the inner plate of the inner removable module 360 exposes an opening in the inner shield 162.

Prior to removal from the irradiation system 10, the radiation source 110 is disconnected from any power couplings, support structures, or other attachments within the first chamber 170. The openings left by the inner and outer removable modules 360, 370 provide a path for removal of the radiation source 110, and the radiation source 110 is moved through these openings to complete the removal process.

The above method provides for lateral removal of the radiation source 110 through the upper level shield 160. This aspect of the invention is advantageous because radiation sources for irradiation systems can be large and heavy, and fragile. It is therefore difficult to remove radiation sources from above using heavy lifting devices. For example, one radiation source, the Rhodotron TT300 accelerator, weighs approximately 22,000 pounds, and may be difficult to remove using lifting devices.

Figure 11B:
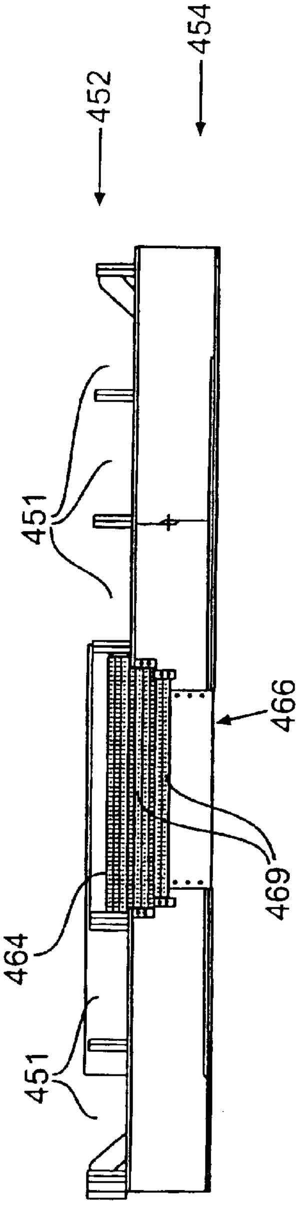
FIG. 11B is a sectional view taken along line 1113——11B in FIG. 11A.

The ceiling assembly 400 of the irradiation system 10 will now be discussed with reference to FIGS. 11A and 11B. FIG. 11A is top view of a section 450 of the ceiling assembly 400, and FIG. 11B is a sectional view taken along line 11B—11B in FIG. 11A. Similar to the modules that form the modular wall structure 300 of the upper level shield 160, the ceiling assembly 400 includes spaces 451 that are filled with ballast material, which serves to prevent the escape of radiation from the upper level shield 160.

The ceiling assembly 400 is formed by an upper level of spaced beams 452, which are supported on a lower level of spaced beams 454, the upper level of spaced beams 452 being oriented perpendicularly to the lower level of spaced beams 454. The beams may be, for example, steel I-beams.

Beams 456 which form the lower level of spaced beams 454 have plates 458 resting in their flanges, so that a continuous horizontal surface is formed over the upper level 100. The plates 458 provide the support surface for ballast (not shown) used to fill in the spaces 451 in the ceiling assembly 400. The ballast is preferably filled in the spaces 451 to a level that is roughly even with the top surface of beams 460 of the upper level of spaced beams 452. In this manner, the ceiling assembly 400 creates a shield against the escape of radiation through the top of the upper level shield 160.

The ceiling assembly 400 may advantageously include one or more ceiling plugs 464, which provide access to the interior of the upper level 100. The ceiling plugs 464 may be mounted in one or more plug locations 466 in the ceiling assembly 400. The plug locations 466 can be formed by constructing a relief for a ceiling plug 464 into the upper and lower levels of spaced beams 452, 454. The ceiling plugs 464 may be mounted in the plug locations 466 using, for example, a gantry crane. Mounting of the ceiling plugs 464 can be facilitated by attaching crane rails (not shown) on the upper level of spaced beams 452. The crane rails may be utilized to act as guides when a crane or other lifting device is used to mount ceiling plugs 464 in the ceiling assembly 400. A ceiling plug 464 can be located over the radiation source 110, and can be sized so that one or more subassemblies of the radiation source 110 can be removed through a plug location 466. A preferred plug location 466 over the radiation source 110 can have a width of, for example, between two arid six feet.

In general, all of the spaces 451 in the ceiling assembly 400 are filled with ballast in order to form an adequate ceiling radiation barrier for the upper level shield 162. The plug locations 466, however, are not filled, so that the ceiling plugs 464 can be easily accessed, which in turn allows for access to the interior of the upper level shield 162.

Depending upon the operation to be performed by the irradiation system 10, the ballast material can be filled in the ceiling assembly 400 to a depth of between, for example 6 inches and 6 feet, if a steel particulate ballast material is used. The depth of the ballast material is dependent upon factors such as the type of ballast material used, and the amount of radiation emitted by the radiation source 110.

The ceiling plugs 464 also serve to attenuate radiation emitted by the radiation source 110, and should have sufficient thickness to limit the escape of radiation from the upper level shield 162. For example, the ceiling plugs 464 may have a thickness of between 3 inches and 3 feet. The ceiling plugs 464 can be assembled of stacked plug elements 469, which can be removed individually. This reduces the overall lifting capacity required when removing or installing the plugs 464.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. An irradiation system comprising:

a radiation source arranged to emit a radiation beam along at least one beam path extending from the radiation source;

an inner shield disposed around the radiation source for attenuating radiation generated by the radiation source, the at least one beam path extending through at least one path aperture in the inner shield;

a first conveyor system for transporting articles through the beam path; and an outer shield for attenuating radiation generated by the radiation source disposed around the inner shield and around at least a part of the first conveyor system.

2. The irradiation system of claim 1, wherein the irradiation system is arranged into an upper level and a lower level, the first conveyor system and the radiation source being located on the upper level, the irradiation system comprising:

a second conveyor system located on the lower level.

3. The irradiation system of claim 2, wherein the upper and lower level are separated by a support surface, the at least one beam path including a vertically extending beam path extending through a path aperture in the support surface for irradiating articles conveyed by the second conveyor system.

4. The irradiation system of claim 1, wherein the first conveyor system comprises:

a process loop disposed around the inner shield.

5. The irradiation system of claim 1, wherein the outer shield forms a first chamber and a second chamber, the first and second chambers being separated by a dividing wall and, the first chamber housing the radiation source.

6. The irradiation system of claim 5, wherein the inner shield comprises:

a removable inner module for allowing access to the radiation source.

7. The irradiation system of claim 6, wherein the outer shield comprises:

a removable outer module for allowing access to the radiation source, the removable inner module and the removable outer module being sized so that the radiation source can pass through the inner and outer shield when the removable inner and outer modules are removed.

8. The irradiation system of claim 5, comprising:

a wall in the second chamber extending substantially parallel to the dividing wall.

9. The irradiation system of claim 5, wherein the first conveyor system comprises:

a process loop disposed around the inner shield;

an entry conveyor system having a first end and a second end, the second end being arranged to convey articles to the process loop; and an exit conveyor system having a first end and a second end, the first end being arranged to convey articles from the process loop, wherein the entry conveyor and the exit conveyor extend through an opening in the dividing wall.

10. The irradiation system of claim 9, wherein the exit conveyor system and the entry conveyor system extend through an opening in the outer shield.

11. The irradiation system of claim 5, the outer shield comprising:

two side walls;

a first end wall extending substantially perpendicularly to and connected to the side walls; and a second end wall connected to the side walls, wherein the dividing wall is substantially parallel to the second end wall.

12. The irradiation system of claim 11, comprising:

a wall in the second chamber extending substantially parallel to the dividing wall.

13. The irradiation system of claim 1, wherein the inner shield comprises:

a removable inner module for allowing access to the radiation source; and a removable outer module for allowing access to the radiation source, the removable inner module and the removable outer module being sized so that the radiation source can pass through openings left in the inner and outer shields when the removable inner and outer modules are removed.

14. The irradiation system of claim 13, comprising:

at least one port in the removable outer module for allowing ballast material to pass out of the removable outer module.

15. The irradiation system of claim 1, comprising:

a ceiling over the upper level comprising a volume of ballast material, a portion of the ballast material covering the outer shield.

16. The irradiation system of claim 1, comprising:

a ceiling extending over the irradiation system and having at least one removable ceiling plug for allowing access to the radiation source.

17. The irradiation system of claim 16, wherein the removable ceiling plug allows for removal of a subassembly of the radiation source from the irradiation system.

18. An irradiation system arranged in an upper level and a lower level, comprising:

a radiation source in the upper level arranged to emit a radiation beam along a first and second beam paths for irradiating articles on the upper level, and to emit radiation along a third beam path for irradiating articles on the lower level;

an upper level shield disposed around the radiation source for attenuating radiation generated by the radiation source, wherein the upper level shield is constructed of adjacent removable modules that are bolted together;

a first conveyor system for transporting articles through the first beam path; and a second conveyor system for transporting articles through the third beam path.

19. The irradiation system of claim 18, wherein the third beam path extends generally vertically from the upper level to the lower level.

20. The irradiation system of claim 18, wherein the upper and lower level are separated by a support surface, the third beam path extending through a path aperture in the support surface.

21. The irradiation system of claim 18, wherein the third beam path intersects the second conveyor system at a location below an area surrounded by the upper level shield.

22. The irradiation system of claim 21, wherein the lower level includes a first chamber and a second chamber, the location where the third beam path and the second conveyor system intersect being located in the first chamber, and the first chamber being at least substantially covered by the upper level shield.

23. The irradiation system of claim 18, wherein the radiation source is arranged to emit a radiation beam along a second beam path for irradiating articles on the upper level.

24. A method of removing a radiation source from an irradiation system comprising a radiation source arranged to emit a radiation beam along a beam path, an inner shield disposed around the radiation source for attenuating radiation generated by the radiation source, and an outer shield disposed around the inner shield, the method comprising:

disconnecting a removable module of the outer shield from the outer shield;

disconnecting a removable module of the inner shield from the inner shield; and removing the radiation source from the irradiation system through openings left by the removable modules.

25. The method of claim 24, wherein the step of disconnecting a removable module of the outer shield comprises:

disconnecting an outer plate of the removable module of the outer shield from adjacent portions of the outer shield; and disconnecting an inner plate of the removable module of the inner shield from adjacent portions of the outer shield.

26. The method of claim 25, wherein the step of disconnecting a removable module of the outer shield comprises:

removing ballast material from the removable module of the outer shield.

27. The method of claim 26, wherein the step of removing ballast material comprises:

opening a port in a bottom portion of the removable module of the outer shield; and allowing the ballast material to pass through the port.

28. The method of claim 25, wherein the step of disconnecting a removable module of the outer shield comprises:

unbolting the removable module of the outer shield from the adjacent portions.

29. The method of claim 25, wherein the step of disconnecting a removable module of the inner shield comprises:

removing ballast material from the removable module of the inner shield;

disconnecting an outer plate of the removable module of the inner shield from adjacent portions of the inner shield; and disconnecting an inner plate of the removable module of the inner shield from the adjacent portions of the inner shield.

30. A shield for a radiation system comprising:

adjacent hollow modules positioned in a path of radiation;

removable plates connecting the adjacent hollow modules;

ballast material filling the hollow modules.

31. The shield of claim 30 wherein the removable plates have two longitudinally extending rows of bolt holes to match corresponding holes on the hollow modules.

32. The shield of claim 31 wherein the modules comprise an inner plate; an outer plate; and a plurality of dividers located between the inner plate and outer plate.

33. The shield of claim 32 wherein the module is higher at the outer plate than at the inner plate.

* * * * *